No. 778,547.  
Patented December 27, 1904.

UNITED STATES PATENT OFFICE.

LEWIS E. PORTER, OF CAMP ROCHESTER, CALIFORNIA.

METHOD OF PRECIPITATING METALS FROM CYANID SOLUTIONS AND REGENERATING THE SOLUTIONS.

SPECIFICATION forming part of Letters Patent No. 778,547, dated December 27, 1904.

Application filed February 15, 1904. Serial No. 193,534.

*To all whom it may concern:*

Be it known that I, LEWIS E. PORTER, a citizen of the United States, residing at Camp Rochester, in the county of San Bernardino and State of California, have invented new and useful Improvements in Methods of Precipitating Metals from Cyanid Solutions and Regenerating the Solutions, of which the following is a specification.

The object of this invention is to precipitate copper and other metals from cyanid solutions in the metallic state and at the same time regenerate the solution, leaving it in condition for use in further treatment of ore.

My invention is intended for application in the usual process of ore-leaching and recovery of the metals from the resulting solution, the ores being leached with alkaline cyanid solution in the usual manner. In case the cyanid solution resulting from leaching the ore contains silver or gold in addition to the copper it will be first subjected to the usual treatment for precipitating such silver and gold, leaving only the copper in the solution.

According to my present invention the cyanid solution containing copper is subjected to the action of zinc-dust and ammonia, precipitating metallic copper and leaving an alkaline cyanid solution suitable for further use. My invention is particularly applicable when the solution already contains lime.

I have found that with the use of ammonia in the above manner the precipitation of copper takes place more smoothly and cleanly and the regeneration is more perfect than when working with zinc-dust alone. The ammonia may be applied directly in the free state or as a salt of ammonia together with an agent which will set free the ammonia therefrom. Thus chlorid or carbonate of ammonia may be used with an alkali, such as hydrate of calcium or lime. Lime will generally be present in the solution, and only enough, if any, need be added to bring the proportion up to the proper amount.

As an example of my process we may take a solution containing, say, twenty pounds of copper cyanid to the ton. To this solution I add as much zinc-dust as is equivalent to the copper in the cyanid—say seven pounds—and also a small amount of ammonia-salt—say two pounds of ammonia chlorid with, say, fifteen pounds of calcium hydrate, or if lime is already present in sufficient quantity no more need be added. The metallic copper is thereby caused to be thrown down as "red copper," and zinc cyanid and alkaline cyanids are formed.

In using my process in the treatment of copper ores they will be leached by the use of alkaline cyanid solution in the usual manner, and if the resulting solution contains the cyanids of gold and silver in addition to copper cyanid the said gold and silver are separated in the usual manner by means of zinc-shavings, leaving a solution of copper cyanid, which is treated as above stated to yield metallic copper and a solution containing zinc cyanid, alkaline cyanid, and a small proportion of ammonia. This resulting solution is then used to leach a further quantity of ore, and in this operation the zinc cyanid and alkaline cyanid (cyanid of potash and cyanid of calcium) are all effective in dissolving the copper, silver, and gold of the ore. The ammonia present is in such small quantity that it will have no substantial effect in dissolving the metals, the ammonia being used in this process only to control or enable the precipitation of the copper by the zinc-dust. The solution resulting from the second leaching is treated as above described to remove the silver and gold therefrom, and then a further quantity of zinc-dust is added, equivalent to the copper content thereof, with, if necessary, enough ammonia to make up for any loss of the latter, thereby precipitating a fresh quantity of copper and regenerating or renewing the solvent containing zinc cyanid and alkaline cyanids.

It will be understood that a continued repetition of this process would cause continuous accumulation of zinc cyanid in the regenerative solution. To overcome this I may add from time to time sufficient carbonate of soda to precipitate a portion of the zinc, as a double carbonate of zinc and lime, which, being insoluble, is precipitated and may be removed from the solution, the latter being thus left with the proper proportion of zinc and alkaline cyanids for the most successful operation. In some cases, however, sufficient alkaline cyanid may be added at each operation to prevent any undue accumulation of zinc cyanid. The cyanid of zinc in the presence of lime is converted to an insoluble compound carbonate of zinc and lime by the carbon dioxid of the atmosphere, and this may be hastened by using a soluble alkaline carbonate, such as carbonate of soda. The cyanogen combined with the zinc goes to the lime or soda in solution, re-forming free alkaline cyanid. A certain amount of zinc cyanid may be retained in the solution, as it is a valuable agent in the dissolving solution.

The above-described process has been successfully used in practice. The following theoretical conditions explain the operativeness of the process: When the alkaline or free cyanid is completely saturated with the metal cyanids which are known to be good solvents for metals, especially the cyanids of zinc and copper, which are good solvents for gold and silver, then ammonia will cause the metals to precipitate in the presence of zinc. The ammonia acts in the place of free cyanid. The zinc-dust used is an impalpable powder, and each particle seems to be entirely consumed with the first precipitation of copper. The zinc-shavings are comparatively coarse, and after the surface has been entirely coated over, first by copper and later by gold and silver, there still remains a mass of zinc which continues to precipitate gold and silver from the copper-cyanid solution without further precipitation of copper. The general operation may therefore be assumed to be as follows: The copper is first precipitated on the zinc-shavings and is then dissolved, being replaced by gold and silver, and the surface exposed by the zinc-shavings should be sufficient to enable precipitation of all the gold and silver from solution by the time that the zinc-shavings are fully coated. When all the gold and silver has thus been deposited, the addition of zinc in the form of dust exposes a far larger amount of surface, so as to precipitate all of the copper present.

What I claim is—

1. The process of separating metals from cyanid solutions and regenerating such solutions, which consists in treating the solution with zinc and ammonia, and separating the metals thereby precipitated.

2. The process of separating metals from alkaline cyanid solution and regenerating such solution, which consists in treating the solution with zinc, alkali and a salt of ammonia which will react therewith to liberate ammonia, and separating the metals thereby precipitated.

3. The process of separating metals from alkaline cyanid solution and regenerating such solution, which consists in treating the solution with zinc, calcium hydrate and a salt of ammonia which will react therewith to liberate ammonia, and separating the metals thereby precipitated.

4. The process of separating metals from alkaline cyanid solution and regenerating such solution, which consists in treating the solution with zinc, calcium hydrate and a salt of ammonia which will react therewith to liberate ammonia, separating the precipitated metals, and adding an alkaline carbonate to precipitate part of the zinc as a double carbonate of zinc and calcium.

5. The process of treating ores containing gold, silver and copper, which consists in leaching the ores with cyanid solution, treating the solution with zinc-shavings to precipitate the gold and silver, adding ammonia and zinc-dust to precipitate the copper, and regenerating the solution and using the regenerated solution in repeating the process.

In testimony whereof I have signed my name to this specification, in the presence of two subscribing witnesses, at Los Angeles, in the county of Los Angeles and State of California, this 8th day of February, 1904.

LEWIS E. PORTER.

Witnesses:
ARTHUR P. KNIGHT,
JULIA TOWNSEND.